United States Patent [19]
Ricks et al.

[11] 3,905,631
[45] Sept. 16, 1975

[54] MAGNETIC FISHING TOOL

[76] Inventors: Tom E. Ricks, 4306 Durango, Odessa, Tex. 79760; Albert Jack Sherman, 1803 W. Broadway Pl., Hobbs, N. Mex. 88240

[22] Filed: May 13, 1974

[21] Appl. No.: 469,464

[52] U.S. Cl. .................. 294/65.5; 294/86.1
[51] Int. Cl.² ............... B66C 1/04; E21B 31/06
[58] Field of Search ............ 294/65.5, 86.1, 86.13, 294/86.14; 166/65 M, 99; 175/328

[56] References Cited
UNITED STATES PATENTS

| | | | |
|---|---|---|---|
| 1,776,027 | 9/1930 | Hinderliter | 294/86.13 X |
| 2,511,140 | 6/1950 | Young | 294/86.13 |
| 2,657,752 | 11/1953 | Ballew et al. | 294/65.5 X |
| 2,734,767 | 2/1956 | Donham | 294/65.5 |
| 2,830,664 | 4/1958 | Kirby | 294/65.5 X |
| 3,441,307 | 4/1969 | Farmer | 294/65.5 |

*Primary Examiner*—Evon C. Blunk
*Assistant Examiner*—Johnny D. Cherry
*Attorney, Agent, or Firm*—Clarence A. O'Brien; Harvey B. Jacobson

[57] ABSTRACT

A tool for fishing magnetic objects from a well, and the like, has a body member including a first portion connectible to a pipe string. A second portion of the body member is cut away along a plane extending from the first portion for providing a surface of sufficient area to receive a magnet capable of attracting all objects being fished.

6 Claims, 5 Drawing Figures

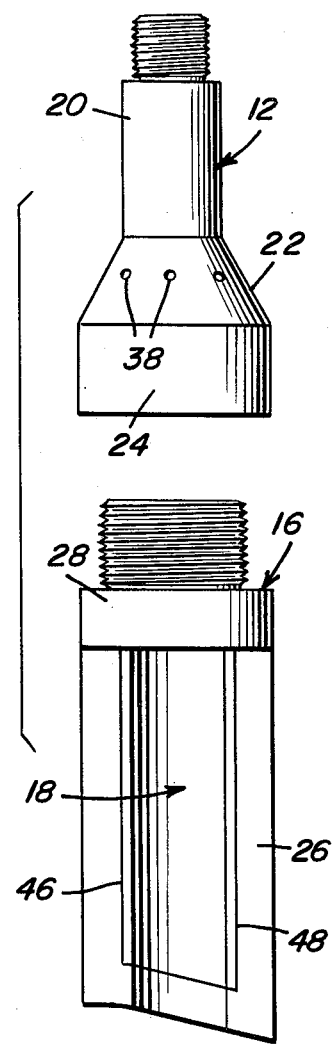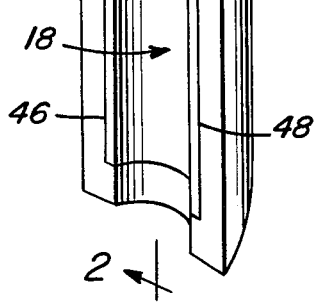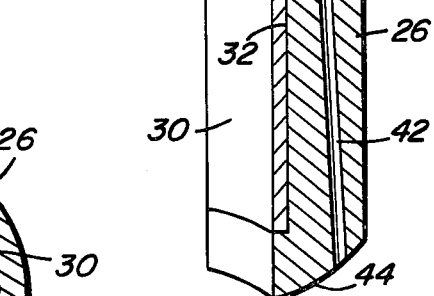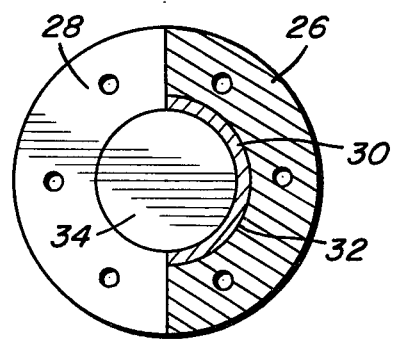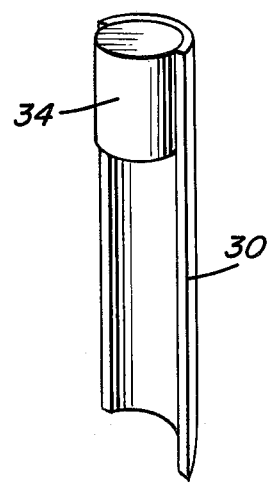

MAGNETIC FISHING TOOL

BACKGROUND OF THE INVENTION

1. Field of the Invention

The present invention relates generally to a magnetic tool for retrieving magnetic objects and fragments from a well bore, and the like, and particularly to such a tool which is capable of picking up difficult objects off the bottom of a well bore.

2. Description of the Prior Art

Magnetic fishing tools are known and generally available on the market. Most of these conventional fishing tools employ a flat bottom design wherein the magnet is arranged presenting a circular planar face defining the upper end of a recess in the lower portion of the tool. See, for example, U.S. Pat. Nos. 3,520,359, issued July 14, 1970 to H. T. Ehrlich, 3,378,089, issued Apr. 16, 1968 to K. R. Marsh, 3,243,218, issued Mar. 29, 1966 to T. E. Jennings, 2,668,077, issued Feb. 2, 1954 to J. H. Kirby II, and 2,431,361, issued Nov. 25, 1947 to C. R. Athy. Some of the more popular designs of this conventional type of fishing tool arrange the ports which permit the circulation of drilling fluid through the magnet, which further reduces the magnet area presented.

When the tools of the conventional type referred to above are being used to fish for a long pin, a drill bit, a shank and cone, or any other long object, the surface area of the magnet is insufficient to successfully pick up a fish. Also, in addition to reducing the effective area of the magnet, the circulation of the drilling fluid through the magnet tends to wash a fish off of and away from the magnet. Even if the fish is picked off the bottom, there is a possibility that the drilling fluid draining out of the drill pipe through the magnet will wash the fish off the tool.

U.S. Pat. No. 1,439,686, issued Dec. 26, 1922 to A. H. Brandon, discloses a magnetic fishing tool which employs an electromagnet to provide the magnetic attraction. Various prongs can be mounted to the electromagnet for assisting in the collection of objects being fished from a well.

SUMMARY OF THE INVENTION

It is an object of the present invention to provide a magnetic fishing tool capable of picking difficult objects, such as long pins, off the bottom of a hole.

It is another object of the present invention to provide a magnetic fishing tool having increased magnetic surface area.

It is yet another object of the present invention to provide a magnetic fishing tool wherein the drilling fluid circulation ports bypass the magnet so as to eliminate the possibility of the drilling fluid draining out over an object that has been fished and washing the object off of the tool.

These and other objects are achieved according to the present invention by providing a magnetic fishing tool having: a body member including a first portion connectible to a pipe string and a second portion cut away along a plane extending from the first portion; and a magnet arranged on the cut away part of the second portion for attracting and holding magnetizable objects.

The first portion of the body member is preferably a hollow cylinder, while the second body member portion is a hollow semi-cylinder. The magnet may include an arcuate member conforming to an inner surface of the semi-cylinder. A generally magnetic cylindrical plug is advantageously matingly arranged in the arcuate member for distributing the magnetic force across the bottom of the tool and for forming a chamber in the first body member portion.

A plurality of jet ports are advantageously provided in the cylinder and semi-cylinder, and are arranged extending from the chamber for placing same in communication with the outside of the tool. These ports are so arranged as to create a circular motion of a drilling fluid passing through the ports for forcing an object being fished into an upright position and toward the center of the tool.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view showing a magnetic fishing tool according to the present invention attached to the lower end of a pipe string.

FIG. 2 is a fragmentary, sectional view taken generally along the line 2—2 of FIG. 1.

FIG. 3 is a sectional view taken generally along the line 3—3 of FIG. 2.

FIG. 4 is an exploded, side elevational view showing the magnetic fishing tool of FIGS. 1 through 3.

FIG. 5 is a perspective view showing a magnet assembly for use with a fishing tool according to the present invention.

DESCRIPTION OF THE PREFERRED EMBODIMENT

Referring now more particularly to FIGS. 1 through 4 of the drawings, a tool 10 according to the present invention has a body member including a first portion 12 selectively connectible in a conventional manner, such as by the illustrated screw threads, to the lower section of a conventional pipe string 14. The body member also includes a second portion 16 selectively connectible to portion 12 in a conventional manner, which also may be by the illustrated screw threads, and being partly cut away along a plane extending from portion 12. A magnetic assembly 18 is arranged on the cut away part of portion 16 for attracting and holding magnetizable objects (not shown).

Portion 12 is advantageously constructed to include a fitting 20 which permits attachment of portion 12 to string 14, a cone 22 which diverges from fitting 20, and a hollow cylinder 24 arranged extending from the larger base of cone 22. In this manner, cone 22 forms a transition between fitting 20 and cylinder 24. Portion 16 is advantageously in the form of a hollow semi-cylinder 26 to which is attached a cylindrical portion 28 facilitating attachment of portion 16 to cylinder 24.

Magnetic assembly 18 advantageously has an arcuate member 30, perhaps best seen in FIG. 5 of the drawings, which conforms to an inner surface 32 of semi-cylinder 26, as can best be seen from FIGS. 1 and 2 of the drawings. A generally magnetic cylindrical plug 34 is matingly arranged in arcuate member 30 for insertion into cylindrical portion 28 and cylinder 24. This arrangement of plug 34 provides a magnetic surface transverse to the direction of extension of the body member as well as along an arcuate surface thereof.

The insertion of plug 34 into cylinder 24 causes a chamber at 36 to be formed in cone 22. A plurality of jet ports 38, 40, and 42 are advantageously provided in cone 22 and portion 16 for placing chamber 36 in communication with the outside of tool 10. In this manner, a drilling fluid (not shown) can be received through pipe string 14 and fitting 20 and emitted through the outer skirt of tool 10 in such a manner as to create a circular motion of the drilling fluid and force an object being fished into an upright position and toward the center of tool 10. Since the drilling fluid comes out of tool 10 beside or below the object being fished, after the object is picked off the bottom of a well (not shown), and the like, there is no danger of the drilling fluid draining out of pipe string 14 and washing the object off of tool 10. Portion 16, which may be referred to as the outer sub or milling sub, has an end 44 spaced from portion 12 which extends away from cylinder 24 from the outer periphery of semi-cylinder 26 to the edges 46 and 48 of semi-cylinder 26 which partially define the cut-away portion of second portion 16. Further, portion 16 has a drop skirt design, and is hard surfaced on the leading side of the skirt and also on the bottom to allow for extensive wear. The drop skirt also acts as a lifting device to bring the "fish," or object being fished, to the center of the well hole.

As can be appreciated from the drawings, magnetic assembly 18 is fully protected by second portion 16. Since magnetic assembly 18 includes arcuate member 30, which may be semi-cylindrical, an object being fished may be caught in the concave of assembly 18 and protected from the walls of a well, thus eliminating the possibility of dragging the object off of the tool by contact of the object with walls of the well or washing of the object off the tool by pulling the object up through the drilling fluid. In summary, the particular arcuate design and arrangement of the magnetic element of tool 10 permits more area of the object being fished to contact the magnet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A magnetic fishing tool, comprising, in combination:
   a. a body member having a first portion connectible to a pipe string and a second portion connected to the first portion and partially cut away along a plane extending from the first portion; and
   b. magnetic means arranged on the cut-away part of the second portion for attracting and holding magnetizable objects, the first portion being a hollow cylinder and the cut-away part of the second portion being a hollow semi-cylinder, the magnetic means including an arcuate member conformingly arranged in an inner surface of the semi-cylinder.

2. A structure as defined in claim 1, wherein the magnetic means further includes a generally magnetic cylindrical plug matingly arranged in the arcuate member.

3. A structure as defined in claim 2, wherein the plug is arranged extending into the hollow cylinder and forming a chamber in cooperation therewith, and further including a plurality of jet ports provided in the hollow cylinder and second portion for placing the chamber in communication with the outside of the tool.

4. A structure as defined in claim 3, wherein an end of the second portion spaced from the hollow cylinder extends away from the hollow cylinder from a point on the outer periphery of the semi-cylinder to edges provided on the semi-cylinder for partially defining the cut-away part of the second portion.

5. A structure as defined in claim 2, wherein an end of the second portion spaced from the hollow cylinder extends away from the hollow cylinder from a point on the outer periphery of the semi-cylinder to edges provided on the semi-cylinder for partially defining the cut-away part of the second portion.

6. A structure as defined in claim 1, wherein an end of the second portion spaced from the hollow cylinder extends away from the hollow cylinder from a point on the outer periphery of the semi-cylinder to edges provided on the semi-cylinder for partially defining the cut-away part of the second portion.

* * * * *